United States Patent
Bruno

(10) Patent No.: US 11,459,110 B2
(45) Date of Patent: Oct. 4, 2022

(54) ENVIRONMENTAL CONTROL SYSTEM UTILIZING TWO PASS SECONDARY HEAT EXCHANGER AND CABIN PRESSURE ASSIST

(71) Applicant: Hamilton Sundstrand Corporation, Windsor Locks, CT (US)

(72) Inventor: Louis J. Bruno, Ellington, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 585 days.

(21) Appl. No.: 15/136,139

(22) Filed: Apr. 22, 2016

(65) Prior Publication Data
US 2017/0305558 A1 Oct. 26, 2017

(51) Int. Cl.
*B64D 13/08* (2006.01)
*B64D 13/06* (2006.01)
(Continued)

(52) U.S. Cl.
CPC ......... *B64D 13/08* (2013.01); *B60H 1/00321* (2013.01); *B64D 13/02* (2013.01);
(Continued)

(58) Field of Classification Search
CPC ........ B64D 13/08; B64D 13/06; B64D 13/02; B64D 2013/0618; B64D 2013/0688;
(Continued)

(56) References Cited

U.S. PATENT DOCUMENTS 2,767,561 A * 10/1956 Bernard, I ............. B64D 13/06
62/241
2,930,205 A * 3/1960 Allen ..................... B64D 13/06
62/241
(Continued)

FOREIGN PATENT DOCUMENTS

CN 1060270 A 4/1992
CN 103010466 B 10/2015
(Continued)

OTHER PUBLICATIONS

Search Report dated Sep. 8, 2017, EP Application No. 17167590, 7 pages.
(Continued)

*Primary Examiner* — Ljiljana V. Ciric
(74) *Attorney, Agent, or Firm* — Cantor Colburn LLP

(57) ABSTRACT

A system of an aircraft includes an inlet arranged in fluid communication with a bleed air source such that the inlet is configured to receive a flow of bleed air. A compressing device includes a compressor having a compressor inlet fluidly connected to the inlet. A heat exchanger is fluidly coupled to an outlet of the compressor. The heat exchanger includes a first pass and a second pass, both of which are located downstream from the compressor. An outlet of the first pass is directly connected to an inlet of the second pass via a first conduit. The outlet of the first pass is also fluidly connected to an inlet of the compressor via a second conduit such that a portion of the bleed air output from the first pass is returned to the compressor inlet via the second conduit.

9 Claims, 3 Drawing Sheets

(51) Int. Cl.
- *B60H 1/00* (2006.01)
- *B60H 1/32* (2006.01)
- *B64D 13/02* (2006.01)
- *B64D 41/00* (2006.01)

(52) U.S. Cl.
CPC ............ *B64D 13/06* (2013.01); *B64D 41/007* (2013.01); *B64D 2013/0618* (2013.01); *B64D 2013/0648* (2013.01); *B64D 2013/0688* (2013.01); *Y02T 50/50* (2013.01)

(58) Field of Classification Search
CPC .......... B64D 41/007; B64D 2013/0648; B60H 1/00321; B60H 1/3233; B60H 1/3222; Y02T 50/56
See application file for complete search history.

(56) References Cited

U.S. PATENT DOCUMENTS

| | | | | |
|---|---|---|---|---|
| 2,959,029 | A * | 11/1960 | Best | B64D 13/06 137/82 |
| 3,097,504 | A * | 7/1963 | Quick | B64D 13/06 62/241 |
| 3,177,679 | A * | 4/1965 | Quick | B64D 13/06 454/71 |
| 3,208,234 | A * | 9/1965 | Messinger | B64D 13/06 165/104.31 |
| 3,587,243 | A * | 6/1971 | Keller et al. | B64D 13/06 62/87 |
| 3,623,332 | A * | 11/1971 | Fernandes | B64D 13/06 62/88 |
| 3,874,188 | A * | 4/1975 | Zara | B64D 13/08 62/272 |
| 3,877,246 | A * | 4/1975 | Schutze | B64D 13/06 62/402 |
| 4,015,438 | A * | 4/1977 | Kinsell | B60H 1/3202 62/88 |
| 4,021,215 | A | 5/1977 | Rosenbush et al. | |
| 4,127,011 | A * | 11/1978 | Giles | B64D 13/06 62/402 |
| 4,198,830 | A * | 4/1980 | Campbell | B64D 13/06 62/87 |
| 4,261,416 | A * | 4/1981 | Hamamoto | B64D 13/06 165/271 |
| 4,263,786 | A * | 4/1981 | Eng | B64D 13/06 62/172 |
| 4,265,397 | A * | 5/1981 | Rannenberg | F24F 5/0085 237/2 B |
| 4,334,411 | A * | 6/1982 | Payne | B64D 13/06 62/172 |
| 4,347,714 | A * | 9/1982 | Kinsell | F02C 6/00 62/402 |
| 4,352,273 | A * | 10/1982 | Kinsell | B64D 13/06 62/87 |
| 4,374,469 | A * | 2/1983 | Rannenberg | B64D 13/06 62/172 |
| 4,430,867 | A * | 2/1984 | Warner | B60H 1/32 62/172 |
| 4,484,451 | A * | 11/1984 | Darm | B01D 5/0015 165/113 |
| 4,684,081 | A * | 8/1987 | Cronin | B64D 13/06 244/118.5 |
| 4,829,775 | A * | 5/1989 | Defrancesco | B64D 13/06 62/402 |
| 4,963,174 | A * | 10/1990 | Payne | B64D 13/06 62/172 |
| 4,966,005 | A * | 10/1990 | Cowell | B64D 13/06 62/172 |
| 4,967,565 | A * | 11/1990 | Thomson | B64D 13/06 62/402 |
| 5,014,518 | A * | 5/1991 | Thomson | B64D 13/06 60/684 |
| 5,086,622 | A * | 2/1992 | Warner | B64D 13/06 62/88 |
| 5,145,124 | A * | 9/1992 | Brunskill | B64D 13/06 244/118.5 |
| 5,309,724 | A * | 5/1994 | Schreiber | B64D 13/06 62/87 |
| 5,309,735 | A * | 5/1994 | Maher, Jr. | B64D 13/00 417/406 |
| 5,323,624 | A * | 6/1994 | Schwalm | B64D 13/06 62/401 |
| 5,373,707 | A * | 12/1994 | Ostersetzer | B64D 13/06 62/401 |
| 5,461,882 | A * | 10/1995 | Zywiak | B60H 1/00007 62/401 |
| 5,511,385 | A * | 4/1996 | Drew | B64D 13/06 62/172 |
| 5,701,755 | A * | 12/1997 | Severson | B64D 13/00 62/402 |
| 5,704,218 | A * | 1/1998 | Christians | B64D 13/06 62/172 |
| 5,768,896 | A * | 6/1998 | Kline | B64D 13/06 62/87 |
| 5,899,085 | A * | 5/1999 | Williams | B64D 13/06 62/236 |
| 5,911,388 | A | 6/1999 | Severson et al. | |
| 6,070,418 | A * | 6/2000 | Crabtree | B64D 13/06 62/172 |
| 6,138,471 | A * | 10/2000 | Ersmambetov | B64D 13/06 62/401 |
| 6,148,622 | A * | 11/2000 | Sanger | B64D 13/06 62/402 |
| 6,189,324 | B1 | 2/2001 | Williams et al. | |
| 6,295,822 | B1 * | 10/2001 | Mueller | B64D 13/06 62/172 |
| 6,381,969 | B1 * | 5/2002 | Afeiche | B64D 13/06 62/87 |
| 6,457,318 | B1 * | 10/2002 | Lui | B64D 13/06 62/402 |
| 6,460,353 | B2 * | 10/2002 | Udobot | B64D 13/06 62/275 |
| 6,484,518 | B1 * | 11/2002 | Laugt | B64D 13/06 62/87 |
| 6,505,474 | B2 * | 1/2003 | Sauterleute | B64D 13/06 62/172 |
| 6,519,969 | B2 * | 2/2003 | Sauterleute | B64D 13/06 62/401 |
| 6,526,775 | B1 * | 3/2003 | Asfia | B64D 13/06 62/402 |
| 6,615,606 | B2 * | 9/2003 | Zywiak | B64D 13/06 62/402 |
| 6,663,044 | B1 * | 12/2003 | Munoz | B64D 13/06 244/118.5 |
| 6,681,591 | B2 * | 1/2004 | Defrancesco | B64D 13/08 62/172 |
| 6,705,092 | B1 * | 3/2004 | Zhou | B01D 53/22 62/401 |
| 6,845,630 | B2 * | 1/2005 | Bruno | B64D 13/06 454/71 |
| 6,883,335 | B2 | 4/2005 | Axe et al. | |
| 6,948,325 | B1 * | 9/2005 | Axe | B64D 13/06 62/127 |
| 6,948,331 | B1 * | 9/2005 | Ho | B64D 13/06 62/401 |
| 7,017,365 | B2 * | 3/2006 | Haas | B64D 13/06 62/401 |
| 7,334,422 | B2 * | 2/2008 | Zywiak | B64D 13/06 62/401 |
| 7,334,423 | B2 * | 2/2008 | Bruno | B64D 13/06 62/402 |
| 7,845,188 | B2 | 12/2010 | Brutscher et al. | |
| 7,849,702 | B2 | 12/2010 | Parikh | |
| 8,500,878 | B2 | 8/2013 | Cremers et al. | |
| 8,915,095 | B2 * | 12/2014 | Bruno | B64D 13/06 62/333 |
| 8,973,393 | B2 | 3/2015 | Atkey et al. | |

(56) References Cited

U.S. PATENT DOCUMENTS

| | | | |
|---|---|---|---|
| 9,022,319 B2* | 5/2015 | Ji | B64D 13/06 |
| | | | 244/118.5 |
| 9,151,539 B2 | 10/2015 | Army et al. | |
| 9,598,175 B2* | 3/2017 | DeValve | B64D 13/06 |
| 9,669,936 B1 | 6/2017 | Fiterman et al. | |
| 9,789,967 B2* | 10/2017 | Shea | B64D 13/06 |
| 9,849,990 B2* | 12/2017 | Bruno | B64D 13/06 |
| 9,889,938 B2* | 2/2018 | Bruno | B64D 13/06 |
| 9,957,051 B2* | 5/2018 | Bruno | B64D 13/06 |
| 10,035,602 B2* | 7/2018 | Bruno | B64D 13/02 |
| 10,137,993 B2* | 11/2018 | Bruno | F01D 17/105 |
| 10,144,517 B2* | 12/2018 | Bruno | F04D 29/5826 |
| 10,184,494 B2* | 1/2019 | Army | F04F 7/00 |
| 10,232,948 B2* | 3/2019 | Bruno | B64D 13/06 |
| 10,457,399 B2* | 10/2019 | Bammann | B64D 13/06 |
| 10,486,817 B2* | 11/2019 | Bruno | B64D 13/06 |
| 10,549,860 B2* | 2/2020 | Bruno | B64D 13/06 |
| 10,597,162 B2* | 3/2020 | Bruno | F01D 5/06 |
| 10,604,263 B2* | 3/2020 | Bruno | B64D 13/04 |
| 10,745,136 B2* | 8/2020 | Bruno | B64D 13/08 |
| 10,773,807 B2* | 9/2020 | Hall | B64D 13/02 |
| 10,870,490 B2* | 12/2020 | Bruno | B64D 13/06 |
| 10,926,884 B2* | 2/2021 | Bruno | B64D 13/08 |
| 10,934,881 B2* | 3/2021 | Bruno | B64D 13/06 |
| 10,940,951 B2* | 3/2021 | Bruno | B60H 1/00428 |
| 10,953,992 B2* | 3/2021 | Bruno | F04D 29/053 |
| 11,047,237 B2* | 6/2021 | Bruno | F04D 29/541 |
| 11,085,673 B2* | 8/2021 | Army | B64D 13/06 |
| 2004/0089016 A1* | 5/2004 | Axe | B64D 13/06 |
| | | | 62/402 |
| 2004/0129835 A1* | 7/2004 | Atkey | B64D 13/06 |
| | | | 244/118.5 |
| 2004/0172963 A1* | 9/2004 | Axe | B64D 13/06 |
| | | | 62/401 |
| 2007/0271952 A1* | 11/2007 | Lui | B64D 13/06 |
| | | | 62/402 |
| 2008/0110193 A1* | 5/2008 | Jonqueres | B64D 13/06 |
| | | | 62/331 |
| 2008/0264084 A1* | 10/2008 | Derouineau | B64D 13/06 |
| | | | 62/172 |
| 2008/0283663 A1* | 11/2008 | Space | B64D 13/06 |
| | | | 244/118.5 |
| 2010/0323601 A1* | 12/2010 | Cremers | B64D 13/06 |
| | | | 454/76 |
| 2012/0285184 A1* | 11/2012 | Voinov | B64D 13/06 |
| | | | 62/87 |
| 2015/0059397 A1 | 3/2015 | Bruno et al. | |
| 2015/0307183 A1 | 10/2015 | Bruno et al. | |
| 2015/0307196 A1* | 10/2015 | Bruno | F02C 6/08 |
| | | | 62/61 |
| 2016/0231031 A1* | 8/2016 | Bruno | B64D 13/06 |
| 2016/0376009 A1* | 12/2016 | Ellsworth | B64D 13/06 |
| | | | 165/202 |
| 2017/0152050 A1* | 6/2017 | Klimpel | B64D 13/08 |
| 2017/0305556 A1* | 10/2017 | Bruno | B64D 13/02 |
| 2017/0305557 A1* | 10/2017 | Bruno | B64D 13/06 |
| 2017/0305558 A1* | 10/2017 | Bruno | B60H 1/00321 |
| 2017/0305560 A1* | 10/2017 | Bruno | B60H 1/00428 |
| 2018/0170554 A1* | 6/2018 | Elsherbini | F25B 1/06 |
| 2019/0366803 A1* | 12/2019 | Harris | B60H 1/3222 |
| 2021/0047044 A1* | 2/2021 | Bruno | B64D 13/06 |
| 2021/0188447 A1* | 6/2021 | Karra | B01D 53/30 |
| 2021/0278108 A1* | 9/2021 | Perez | F25B 9/004 |

FOREIGN PATENT DOCUMENTS

| | | | |
|---|---|---|---|
| DE | 102010013956 A1 | 10/2011 | |
| EP | 1053176 A1 | 11/2000 | |
| EP | 3095702 A1 | 11/2016 | |

OTHER PUBLICATIONS

First Office Action; Chinese Application No. 201710265462.X; International Filing Date: Apr. 21, 2017; dated Dec. 30, 2020; 13 pages with translation.

Second Chinese Office Action; Chinese Application No. 201710265462; dated Jul. 28, 2021; 8 pages.

Brazilian Office Action; Brazilian Application No. BR102017008239; dated Nov. 16, 2021; 6 pages.

* cited by examiner

ENVIRONMENTAL CONTROL SYSTEM UTILIZING TWO PASS SECONDARY HEAT EXCHANGER AND CABIN PRESSURE ASSIST

BACKGROUND

In general, with respect to present air conditioning systems of aircraft, cabin pressurization and cooling is powered by engine bleed pressures at cruise. For example, pressurized air from an engine of the aircraft is provided to a cabin through a series of systems that alter the temperatures and pressures of the pressurized air. To power this preparation of the pressurized air, the only source of energy is the pressure of the air itself. As a result, the present air conditioning systems have always required relatively high pressures at cruise. Unfortunately, in view of an overarching trend in the aerospace industry towards more efficient aircraft, the relatively high pressures provide limited efficiency with respect to engine fuel burn.

SUMMARY

According to one embodiment, a system is provided. The system includes an inlet providing a first medium; a compressing device comprising a compressor, and at least one heat exchanger located downstream of the compressor. The compressing device is in communication with the inlet providing the first medium. The at least one heat exchanger includes a first pass and a second pass. An outlet of the first pass of the at least one heat exchanger is in fluid communication with an inlet of the compressor.

Additional features and advantages are realized through the techniques of the embodiments herein. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION OF THE INVENTION

A detailed description of one or more embodiments of the disclosed apparatus and method are presented herein by way of exemplification and not limitation with reference to the FIGS.

Embodiments herein provide an environmental control system that utilizes a two pass heat exchanger patent that includes quench loop and recirculation air mixed in between the two passes to leverage lower pressure engine bleed air to provide cabin pressurization and cooling at a high engine fuel burn efficiency.

Figure 1:
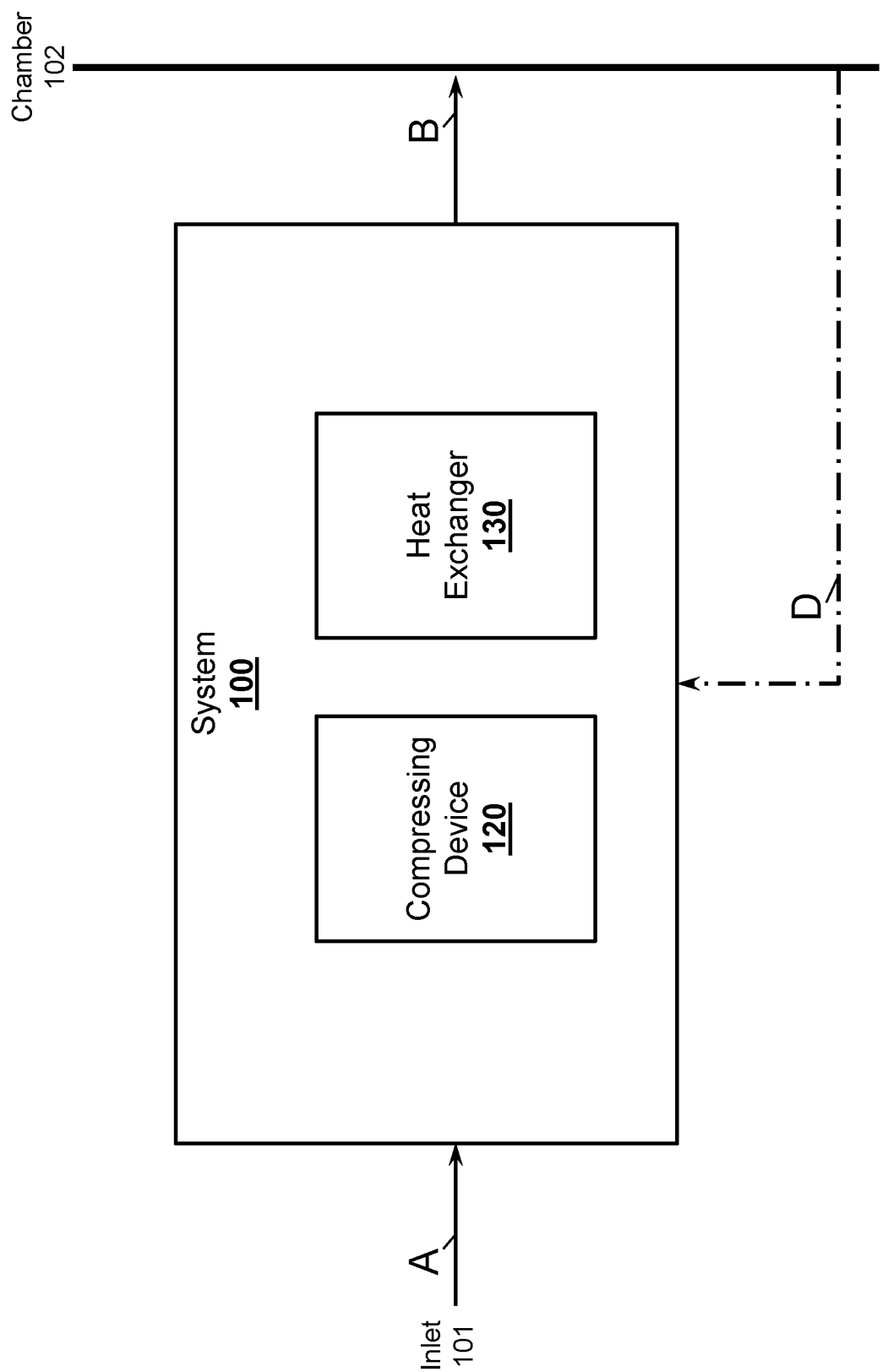
FIG. 1 is a diagram of an schematic of an environmental control system according to an embodiment.

In general, embodiments of the environmental control system may include one or more heat exchangers and a compressing device. A medium, bled from a low-pressure location of an engine, flows through the one or more heat exchangers into a chamber. Turning now to FIG. 1, a system 100 that receives a medium from an inlet 101 and provides a conditioned form of the medium to a chamber 102 is illustrated. The system 100 comprises a compressing device 120 and a heat exchanger 130. The elements of the system are connected via valves, tubes, pipes, and the like. Valves are devices that regulate, direct, and/or control a flow of a medium by opening, closing, or partially obstructing various passageways within the tubes, pipes, etc. of the system 100. Valves can be operated by actuators, such that flow rates of the medium in any portion of the system 100 can be regulated to a desired value.

As shown in FIG. 1, a medium can flow from an inlet 101 through the system 100 to a chamber 102, as indicated by solid-lined arrows A, B. In the system 100, the medium can flow through the compressing device 120, through the heat exchanger 130, from the compressing device 120 to the heat exchanger 130, from the heat exchanger 130 to the compressing device 120, etc. Further, the medium can recirculate from the chamber 102 to the system 100, as indicated by the dot-dashed lined arrow D (and can then flow back to the chamber 102 and/or external to the system 100).

The medium, in general, can be air, while other examples include gases, liquids, fluidized solids, or slurries. When the medium is being provided from the chamber 102 of the system 100, the medium is referred to herein as recirculated air. When the medium is being provided by an engine connected to the system 100, such as from the inlet 101, the medium can be referred to herein as bleed air. With respect to bleed air, a low-pressure location of the engine (or an auxiliary power unit) can be utilized to provide the medium at an initial pressure level near a pressure of the medium once it is in the chamber 102 (e.g., chamber pressure, also referred to as cabin pressure in the aircraft example).

For instance, continuing with the aircraft example above, air can be supplied to the environmental control system by being "bled" from a compressor stage of a turbine engine. The temperature, humidity, and pressure of this bleed air varies widely depending upon a compressor stage and a revolutions per minute of the turbine engine. Since a low-pressure location of the engine is utilized, the air may be slightly above or slightly below cabin pressure (e.g., the pressure in the chamber 102). Bleeding the air at such a low pressure from the low-pressure location causes less of a fuel burn than bleeding air from a higher pressure location. Yet, because the air is starting at this relatively low initial pressure level and because a drop in pressure occurs over the one or more heat exchangers, a pressure of the air may drop below the cabin pressure while the air is flowing through the heat exchanger 130. When the pressure of the air is below the cabin pressure, the air will not flow into the chamber to provide pressurization and temperature conditioning. To achieve the desired pressure, the bleed-air can be compressed as it is passed through the compressing device 120.

The compressing device 120 is a mechanical device that controls and manipulates the medium (e.g., increasing the pressure of bleed air). Examples of a compressing device 120 include an air cycle machine, a three-wheel machine, a four wheel-machine, etc. The compressing can include a compressor, such as a centrifugal, a diagonal or mixed-flow, axial-flow, reciprocating, ionic liquid piston, rotary screw, rotary vane, scroll, diaphragm, air bubble compressors, etc. Further, compressors can be driven by a motor or the medium (e.g., bleed air, chamber discharge air, and/or recirculation air) via a turbine.

The heat exchanger 130 is a device built for efficient heat transfer from one medium to another. Examples of heat exchangers include double pipe, shell and tube, plate, plate and shell, adiabatic wheel, plate fin, pillow plate, and fluid heat exchangers., air forced by a fan (e.g., via push or pull methods) can be blown across the heat exchanger at a variable cooling airflow to control a final air temperature of the bleed air.

Figure 2:
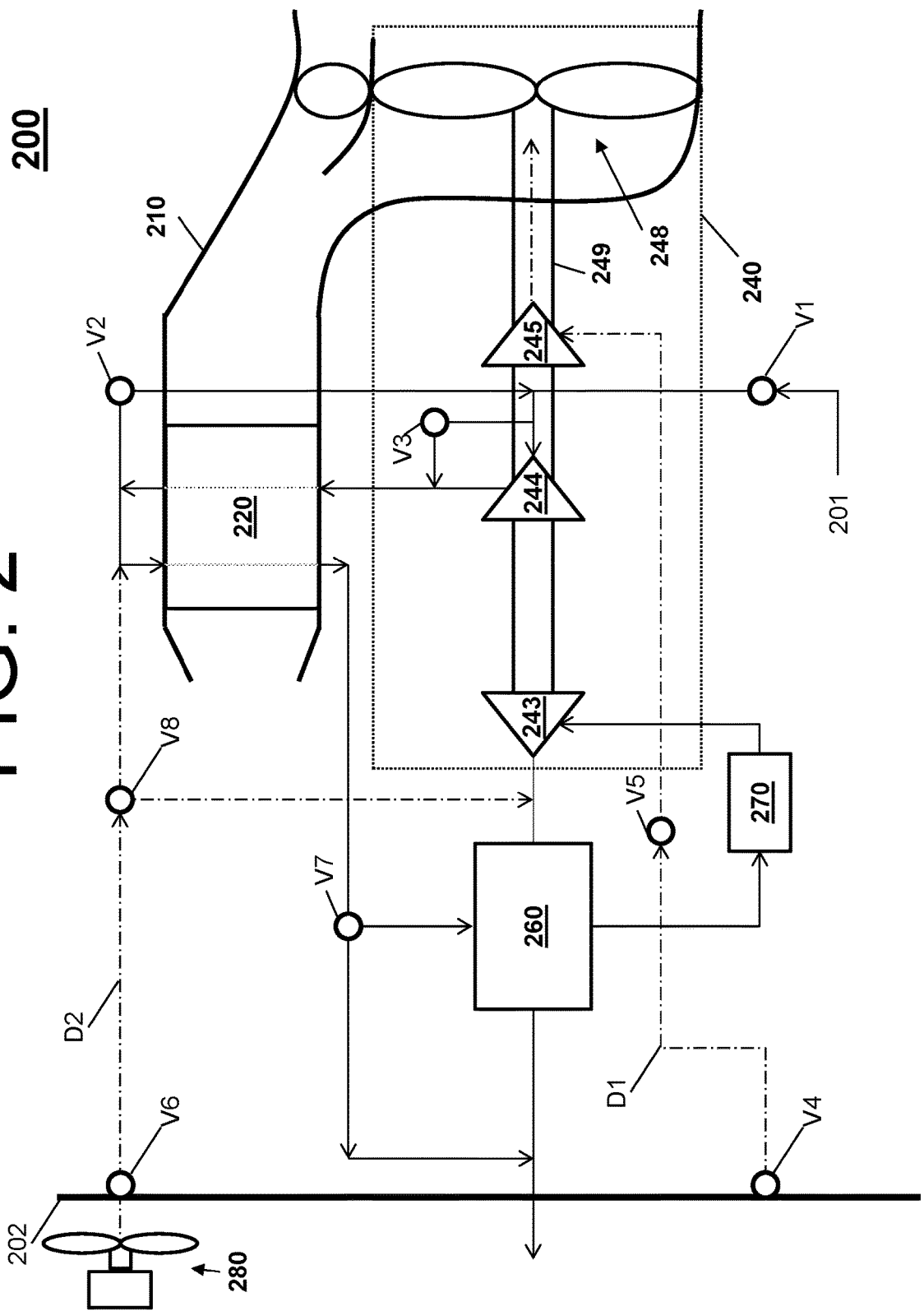
FIG. 2 is operation example of an environmental control system according to an embodiment.

The system 100 of FIG. 1 will now be described with reference to FIG. 2, in view of the aircraft example. FIG. 2 depicts a schematic of a system 200 (e.g., an embodiment of system 100) as it could be installed on an aircraft.

The system 200 will now be describe with respect to a conventional bleed air driven environmental control system of an airplane utilizing a contemporary cabin three-wheel air conditioning system. The conventional bleed air driven air environmental control system receives bleed air at a pressure between 30 psia (e.g., during cruise) and 45 psia (e.g., on the ground). In the conventional bleed air driven air environmental control system, during hot day ground operation, the centrifugal compressor of the air cycle machine receives nearly all of the flow of the bleed air at a pressure of approximately 45 psia. Further, during hot day cruise operation, the centrifugal compressor of the air cycle machine receives only a portion of the flow of the bleed air at a pressure of 30 psia. The remainder of the bleed air bypasses the centrifugal compressor via the air cycle machine bypass valve and is sent to the cabin.

In contrast to the conventional bleed air driven environmental control system utilizing the contemporary cabin three-wheel air conditioning system, the system 200 is an example of an environmental control system of an aircraft that provides air supply, thermal control, and cabin pressurization for the crew and passengers of the aircraft at a high engine fuel burn efficiency. The system 200 illustrates bleed air flowing in at inlet 201 (e.g., off an engine of an aircraft at an initial flow rate, pressure, temperature, and humidity), which in turn is provided to a chamber 202 (e.g., cabin, flight deck, pressurized volume, etc.) at a final flow rate, pressure, temperature, and humidity. The bleed air can recirculate back through the system 200 from the chamber 202 (herein cabin discharge air and recirculated air, which in FIG. 2 are represented by the dot-dashed lines D1 and D2, respectively) to drive and/or assist the system 200.

The system in includes a shell 210 for receiving and directing ram air through the system 200. Note that based on the embodiment, an exhaust from the system 200 can be sent to an outlet (e.g., releases to ambient air through the shell 210).

The system 200 further illustrates valves V1-V8, a heat exchanger 220, an air cycle machine 240 (that includes a turbine 243, a compressor 244, a turbine 245, a fan 248, and a shaft 249), a condenser 260, a water extractor 270, and a recirculation fan 280, each of which is connected via tubes, pipes, and the like. Note that the heat exchanger 220 is an example of the heat exchanger 130 as described above. Further, in an embodiment, the heat exchanger 220 is a secondary heat exchanger that is downstream of a primary heat exchanger (not shown). Note also that the air cycle machine 240 is an example of the compressing device 120 as described above.

The air cycle machine 240 extracts work from the medium or performs work on the medium by raising and/or lowering pressure and by raising and/or lowering temperature. The compressor 244 is a mechanical device that raises the pressure of the bleed-air received from the inlet 201. The turbines 243, 245 are mechanical devices that drive the compressor 244 and the fan 248 via the shaft 249. The fan 248 is a mechanical device that can force via push or pull methods air through the shell 210 across the secondary heat exchanger 220 at a variable cooling airflow. Thus, the turbines 243, 245, the compressor 244, and the fan 248 together illustrate, for example, that the air cycle machine 240 may operate as a four-wheel air cycle machine that utilizes air recirculated or discharged from the chamber 202 (e.g., in an embodiment, the air cycle machine 240 utilizes the chamber discharge air to perform compressing operations, as indicated by dot-dashed line D1.)

The condenser 260 is particular type of heat exchanger. The water extractor 270 is a mechanical device that performs a process of taking water from any source, such as bleed-air, either temporarily or permanently. The recirculation fan 280 is a mechanical device that can force via a push method air recirculation into the system 200, as indicated by dot-dashed arrow D2.

In a high pressure mode of operation of the system 200, high-pressure high-temperature air is received from the inlet 201 through the valve V1. The high-pressure high-temperature air enters the compressor 244. The compressor 244 pressurizes the high-pressure high-temperature and in the process heats it. This air then enters a first pass of the heat exchanger 220 and is cooled by ram air. The air exiting the first pass of the heat exchanger 220 then enters the second pass of the heat exchanger 220 to produce cool high pressure air. This cool high pressure air enters through the valve V7 into the condenser 260 and the water extractor 270, where the air is cooled and the moisture removed. The cool high pressure air enters the turbine 243, where it is expanded and work extracted. The work from the turbine 243 can drive both the compressor 244 and the fan 248. The fan 248 is used to pull a ram air flow through the heat exchanger 220. Also, by expanding and extracting work on the cool high pressure air, the turbine 243 produces cold bleed air. After leaving the turbine 243, the cold bleed air is mixed at a mixing point with the recirculation air D2 provided by the fan 280 through from the valves V6 and V8. The mixing point in this case can be downstream of the compressing device 240. This mixing point can also be referred to as downstream of the compressor 244 and downstream of the turbine 243. By mixing the cold bleed air with the recirculation air D2, the system 200 utilizes the recirculation air, which is warm and moist, to level out the cold bleed air (e.g., raise the temperature). This leveled out bleed air, in turn, enters a low pressure side of the condenser 260, cools the bleed air on the high pressure side of the condenser 260, and is sent to condition the chamber 202.

Note that when operating in the high pressure mode, it is possible for the air leaving the compressor 244 to exceed an auto-ignition temperature of fuel (e.g., 400 F for steady state and 450 F for transient). In this situation, air from an outlet of a first pass of the heat exchanger 220 is ducted by the valve V2 to an inlet of the compressor 244. This lowers an inlet temperature of the air entering the inlet of the compressor 244 and, as a result, the air leaving the compressor 244 is below the auto-ignition temperature of fuel.

The high pressure mode of operation can be used at flight conditions when engine pressure is adequate to drive the cycle or when a temperature of the chamber 202 demands it.

For example, conditions, such as ground idle, taxi, take-off, climb, and hold conditions would have the air cycle machine 240 operating in the high pressure mode. In addition, extreme temperature high altitude cruise conditions could result in the air cycle machine 240 operating in the high pressure mode.

In a low pressure mode of operation, the bleed air from the inlet 201 through the valve V1 bypasses the air cycle machine 240 and directly through the first pass of the heat exchanger 220. Upon exiting the first pass, the bleed air then mixes at a mixing point with the recirculation air recirculation air D2 provided by the fan 280 through the valves V6 and V8 to produce mixed air. The mixing point in this case can be downstream of the compressor 244 and/or upstream of a second pass of the heat exchanger 220. The mixed air enters the second pass of the heat exchanger 220, where it is cooled by ram air to the temperature required by the chamber 202 to produce cool air. The cool air then goes directly into the chamber 202 via the valve V7. Further, the chamber discharge air D1 is used to keep the air cycle machine 240 turning at a minimum speed. That is, chamber discharge air D1 flowing from the chamber 202 through the valves V4 and V5 enters and expands across the turbine 245, so that work is extracted. This work is utilized to turn the air cycle machine 240 at, for example, a minimum speed of approximately 6000 rpm. The air exiting the turbine 245 is then dumped overboard through the shell 210.

The low pressure mode can be used at flight conditions where the pressure of the bleed air entering the air cycle machine 240 is approximately 1 psi above the chamber pressure (e.g., conditions at cruise where altitudes are above 30,000 ft. and conditions at or near standard ambient day types).

In a boost pressure mode of operation, the bleed air from the inlet 201 enters the compressor 244, where it is compressed and heated. The compressed and heated air from the compressor 244 passes through the first pass of the heat exchanger 220 and then mixes at a mixing point with the recirculation air D2 provided by the fan 280 through the valves V6 and V8 to produce mixed air. The mixing point in this case can be downstream of the compressor 244 and/or upstream of a second pass of the heat exchanger 220. The mixed air enters the second pass of the heat exchanger 220, where it is cooled by ram air to the temperature required by the chamber 202 to produce cool air. The cool air then goes directly into the chamber 202 via valve V7. Further, the cabin discharge air D1 is used to provide the energy to pressurize the bleed air entering the compressor 244. That is, the chamber discharge air D1 flowing from the chamber 202 through the valves V4 and V5 enters and expands across the turbine 245, so that work is extracted. The amount of work extracted by the turbine 245 is enough to turn the air cycle machine 240 at the speed required by the compressor 244 to raise a pressure of the bleed to a value that can drive the bleed air through the heat exchanger 220 and into the chamber 202.

The boost pressure mode can be used at flight conditions where the pressure of the bleed air entering the air cycle machine 240 is as low as 2.5 psi below the chamber pressure (e.g., conditions at cruise where altitudes are above 30,000 ft. and conditions at or near standard ambient day types).

Figure 3:
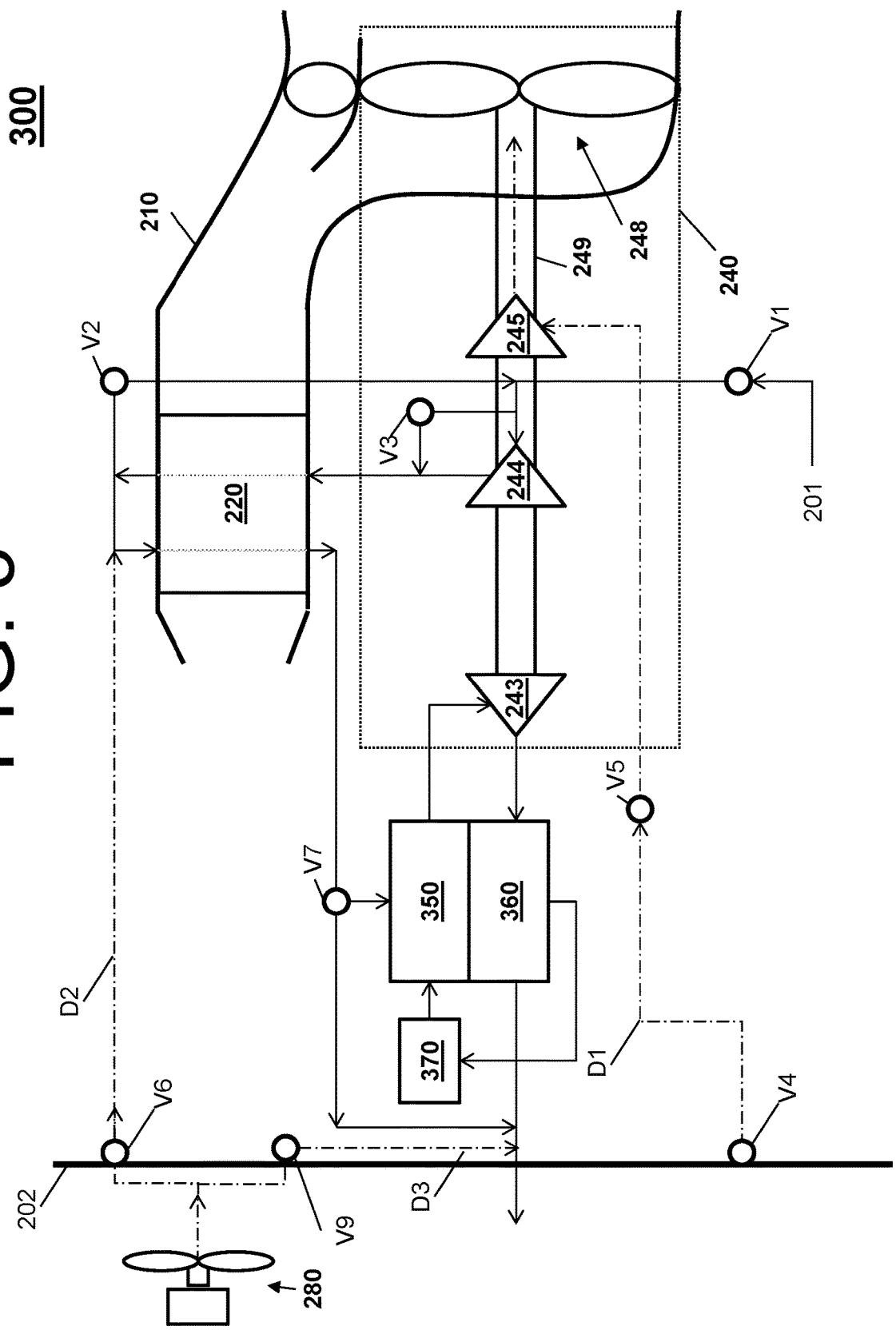
FIG. 3 is operation example of an environmental control system according to another embodiment.

The system 100 of FIG. 1 will now be described with reference to FIG. 3, in view of the aircraft example. FIG. 3 depicts a schematic of a system 300 (e.g., an embodiment of system 100) as it could be installed on an aircraft. Components of the system 300 that are similar to the system 200 have been reused for ease of explanation, by using the same identifiers, and are not re-introduced. Alternative components of the system 300 include a valve V9, a reheater 350, a condenser 360, and a water extractor 370, along with an alternative path for the recirculation air denoted by the dotted-dashed line D3.

The reheater 350 and the condenser 260 are particular types of heat exchanger. The water extractor 370 is a mechanical device that performs a process of taking water from any source, such as bleed-air. Together, the reheater 350, the condenser 260, and/or the water extractor 370 can combine to be a high pressure water separator.

In a high pressure mode of operation, high-pressure high-temperature air is received from the inlet 201 through the valve V1. The high-pressure high-temperature air enters the compressor 244. The compressor 244 pressurizes the high-pressure high-temperature and in the process heats it. This air then enters a first pass of the heat exchanger 220 and is cooled by ram air. The first pass of the heat exchanger 220 then enters the second pass of the heat exchanger 220 to produce cool high pressure air. This cool high pressure air enters through the valve V7 into the reheater 350, where it is cooled; through the condenser 360, where it is cooled by air from the turbine 243; through the water extractor 370, where the moisture in the air is removed; and again into the reheater 350, where the air is heated to nearly an inlet temperature at the valve V7. The warm high pressure and now dry air enters the turbine 243, where it is expanded and work extracted. The work from the turbine 243 can drive both the compressor 244 and the fan 248. The fan 248 is used to pull a ram air flow through the heat exchanger 220. After leaving the turbine 243, the cold air, typically below freezing, cools the warm moist air in the condenser 360. Downstream of the condenser 360, the cold air leaving the air cycle machine 240 mixes at a mixing point with the recirculation air D3 provided by the fan 280 through the valve V9 to produce mixed air. The mixing point in this case can be downstream of the compressing device 240. This mixing point can also be referred to as downstream of the compressor 244 and downstream of the turbine 243. This mixed air then sent to condition the chamber 202.

When operating in the high pressure mode, it is possible for the air leaving the compressor 244 to exceed an auto-ignition temperature of fuel (e.g., 400 F for steady state and 450 F for transient). In this situation, air from an outlet of the first pass of the heat exchanger 220 is ducted by the valve V2 to an inlet of the compressor 244. This lowers an inlet temperature of the air entering the inlet of the compressor 244 and, as a result, the air leaving the compressor 244 is below the auto-ignition temperature of fuel.

The high pressure mode of operation can be used at flight conditions when engine pressure is adequate to drive the cycle or when a temperature of the chamber 202 demands it. For example, conditions, such as ground idle, taxi, take-off, climb, and hold conditions would have the air cycle machine 240 operating in the high pressure mode. In addition, extreme temperature high altitude cruise conditions could result in the air cycle machine 240 operating in the high pressure mode.

In a low pressure mode of operation, the bleed air from the inlet 201 through the valve V1 bypasses the air cycle machine 240 and directly through the first pass of the heat exchanger 220. Upon exiting the first pass, the bleed air then mixes at a mixing point with the recirculation air D2 provided by the fan 280 through the valve V6 to produce mixed air. The mixing point in this case can be downstream of the compressor 244 and/or upstream of a second pass of the heat exchanger 220. The mixed air enters the second pass of the heat exchanger 220, where it is cooled by ram air to the temperature required by the chamber 202 to produce cool air. The cool air then goes directly into the chamber 202 via valve V7. Further, the chamber discharge air D1 is used to keep the air cycle machine 240 turning at a minimum speed. That is, the chamber discharge air D1 flowing from the chamber 202 through the valves V4 and V5 enters and expands across the turbine 245, so that work is extracted. This work is utilized to turn the air cycle machine 240 at, for example, a minimum speed of approximately 6000 rpm. The air exiting the turbine 245 is then dumped overboard through the shell 210.

The low pressure mode can be used at flight conditions where the pressure of the bleed air entering the air cycle machine 240 is approximately 1 psi above the chamber pressure (e.g., conditions at cruise where altitudes are above 30,000 ft. and conditions at or near standard ambient day types).

In a boost pressure mode of operation, the bleed air from the inlet 201 enters the compressor 244, where it is compressed and heated. The compressed and heated air from the compressor 244 passes through the first pass of the heat exchanger 220 and then mixes at a mixing point with the recirculation air D2 provided by the fan 280 through the valve V6 to produce mixed air. The mixing point in this case can be downstream of the compressor 244 and/or upstream of a second pass of the heat exchanger 220. The mixed air enters the second pass of the heat exchanger 220, where it is cooled by ram air to the temperature required by the chamber 202 to produce cool air. The cool air then goes directly into the chamber 202 via valve V7. Further, the cabin discharge air D1 is used to provide the energy to pressurize the bleed air entering the compressor 244. That is, the chamber discharge air D1 flowing from the chamber 202 through the valves V4 and V5 enters and expands across the turbine 245, so that work is extracted. The amount of work extracted by the turbine 245 is enough to turn the air cycle machine 240 at the speed required by the compressor 244 to raise a pressure of the bleed to a value that can drive the bleed air through the heat exchanger 220 and into the chamber 202.

The boost pressure mode can be used at flight conditions where the pressure of the bleed air entering the air cycle machine 240 is as low as 2.5 psi below the chamber pressure (e.g., conditions at cruise where altitudes are above 30,000 ft. and conditions at or near standard ambient day types).

Aspects of the embodiments are described herein with reference to flowchart illustrations, schematics, and/or block diagrams of methods, apparatus, and/or systems according to embodiments of the invention. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system of an aircraft, the system comprising:
   an inlet arranged in fluid communication with a bleed air source such that the inlet is configured to receive a flow of bleed air;
   a compressing device including a compressor having a compressor inlet, the compressor inlet being fluidly connected to the inlet; and
   a heat exchanger being fluidly coupled to an outlet of the compressor, wherein the heat exchanger includes a first pass and a second pass, both the first pass and the second pass being located downstream from the compressor; and
   wherein an outlet of the first pass of the heat exchanger is directly connected to an inlet of the second pass via a first conduit and the outlet of the first pass is fluidly connected to an inlet of the compressor via a second conduit such that a portion of the bleed air output from the first pass is returned to the compressor inlet via the second conduit.

2. The system of claim 1, comprising:
   a second inlet configured to receive a flow of recirculation air from a recirculation air source, the second inlet being fluidly coupled to the heat exchanger between the outlet of the first pass and the inlet of the second pass such that a mixture of recirculation air and bleed air is provided to the inlet of the second pass of the heat exchanger.

3. The system of claim 2, wherein the recirculation air source is a pressurized volume of the aircraft .

4. The system of claim 1, wherein the bleed air source is an engine.

5. The system of claim 1, wherein the heat exchanger is a ram air heat exchanger.

6. A system of an aircraft, the system comprising:
   a first inlet arranged in fluid communication with a bleed air source such that the first inlet is configured to receive a flow of bleed air;
   a second inlet arranged in fluid communication with a recirculation air source such that the second inlet is configured to receive a flow of recirculation air;
   a compressing device arranged in fluid communication with the first inlet, the compressing device comprising a compressor having a compressor inlet and a compressor outlet, wherein the compressor inlet is configured to receive the flow of bleed air from the first inlet; and a heat exchanger fluidly connected to the compressor outlet such that the flow of bleed air output from the compressor outlet is provided to the heat exchanger, the heat exchanger including a first pass and a second pass, both the first pass and the second pass being located downstream from the compressing device;

wherein the second inlet is arranged in fluid communication with the heat exchanger at a location downstream from the outlet of the first pass such that the flow of recirculation air is mixes with the flow of bleed air output from the first pass at the inlet of the second pass of the heat exchanger.

7. The system of claim 6, wherein the recirculation air source is a pressurized volume of the aircraft.

8. The system of claim 6, wherein the bleed air source is an engine.

9. The system of claim 6, wherein the heat exchanger is a ram air heat exchanger.

\* \* \* \* \*